United States Patent Office 3,448,362
Patented June 3, 1969

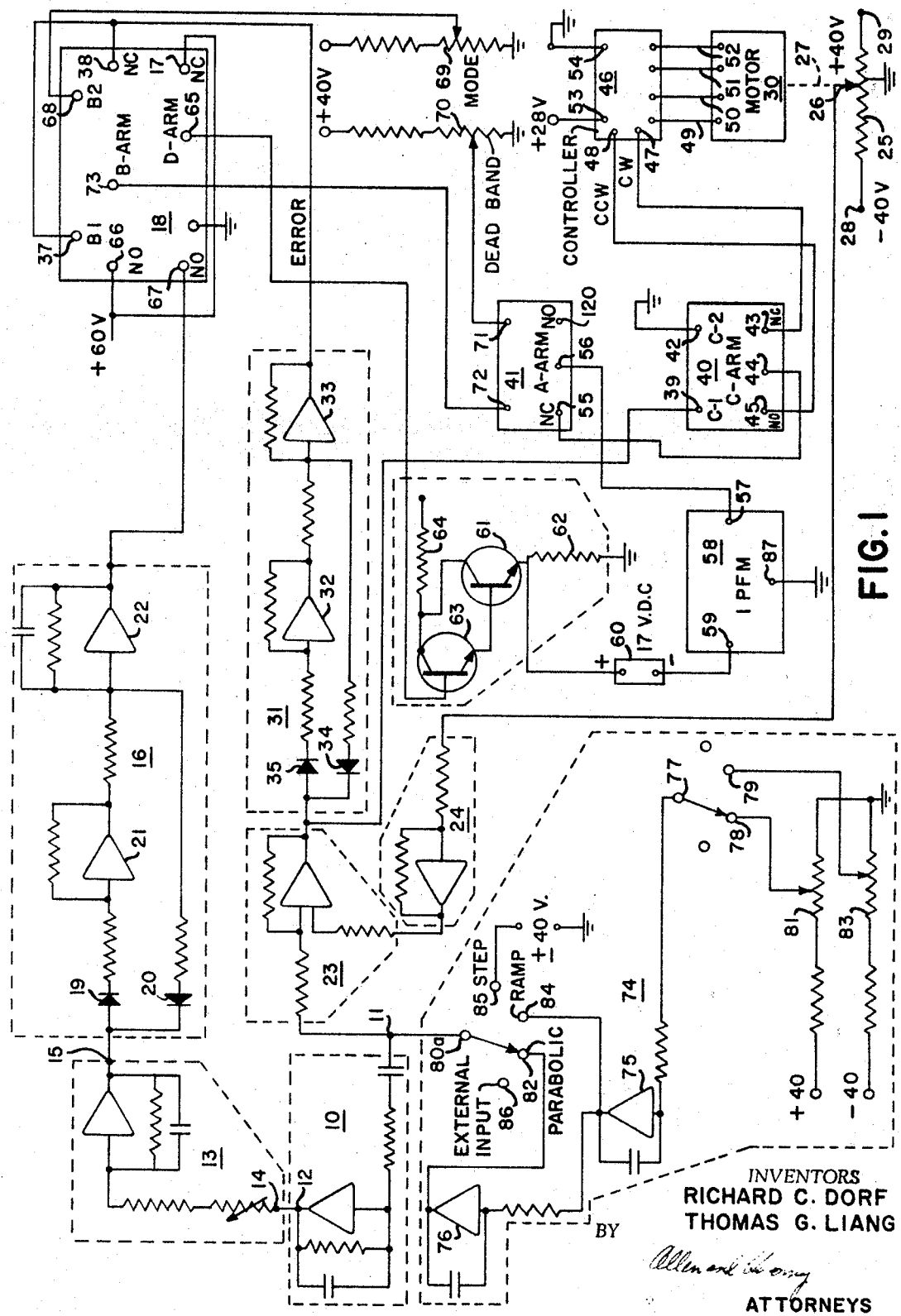

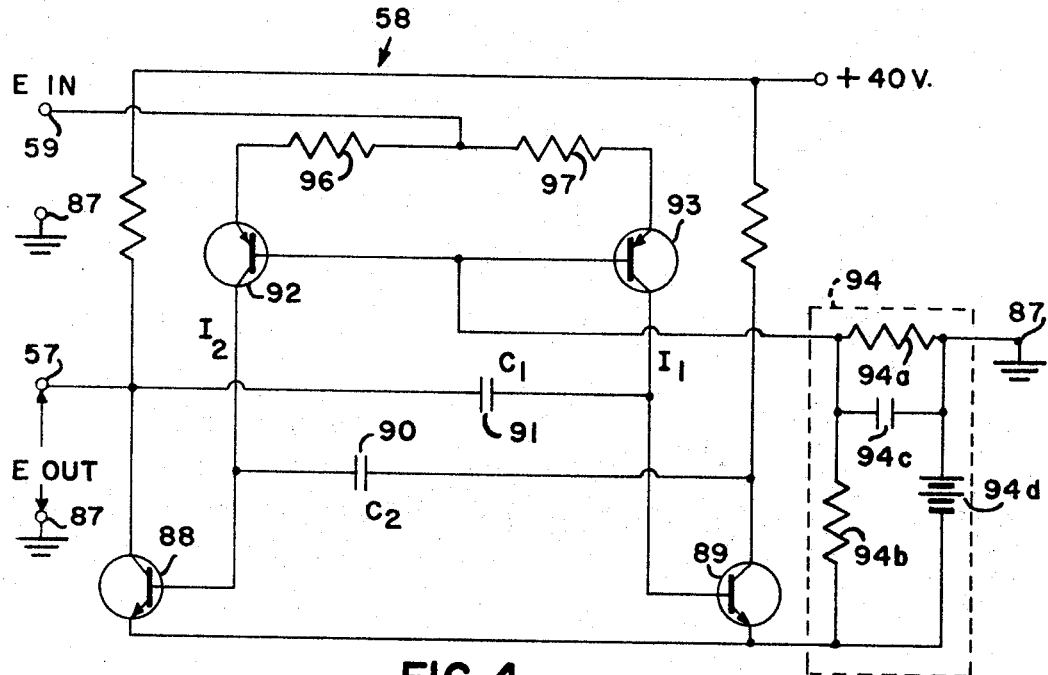
FIG. 4
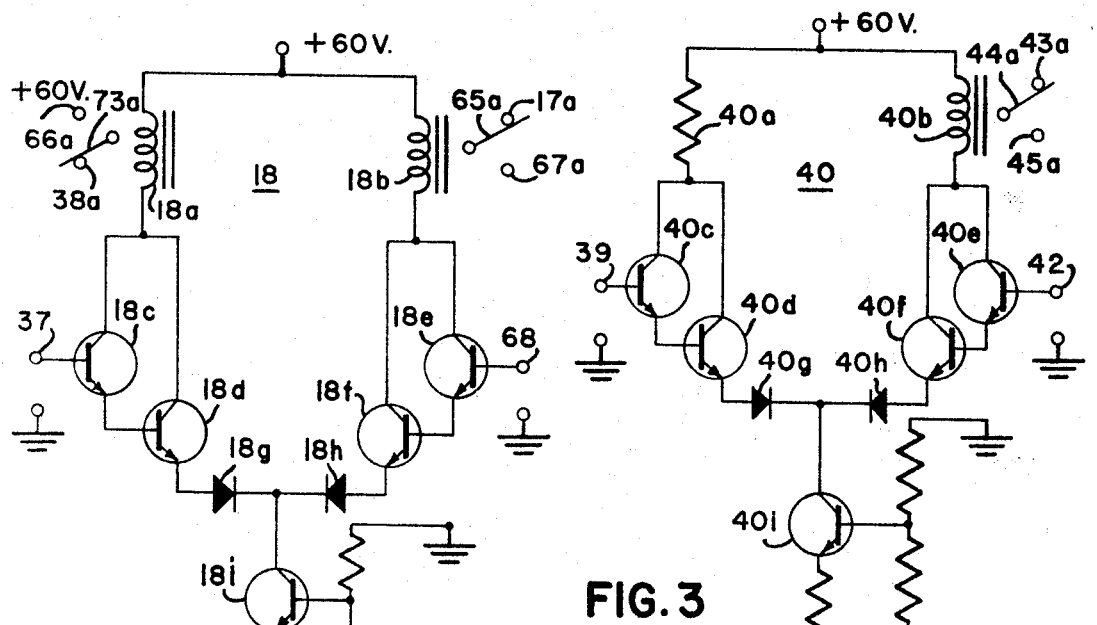
FIG. 2
FIG. 3

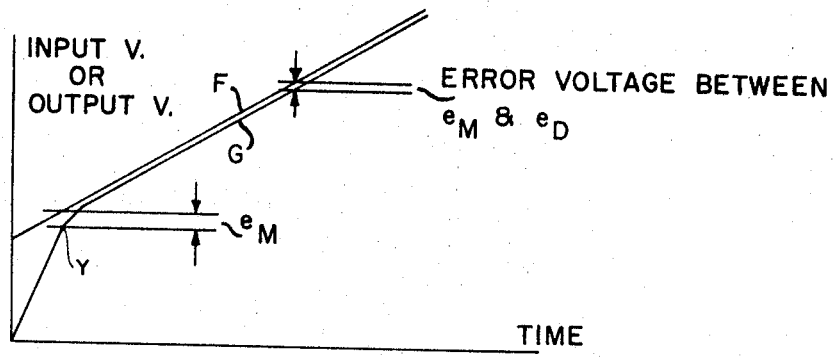
FIG. 8
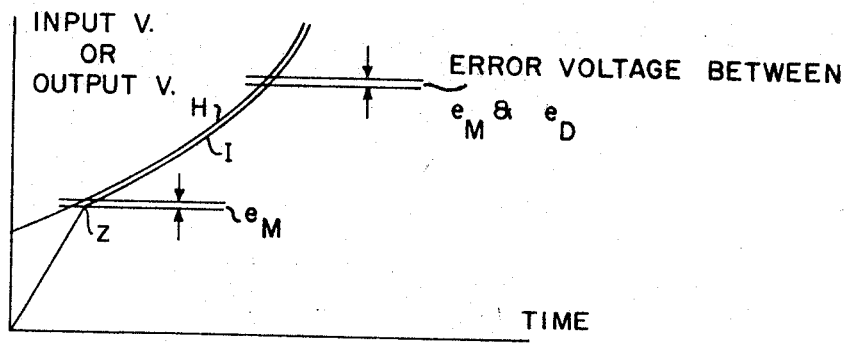
FIG. 9
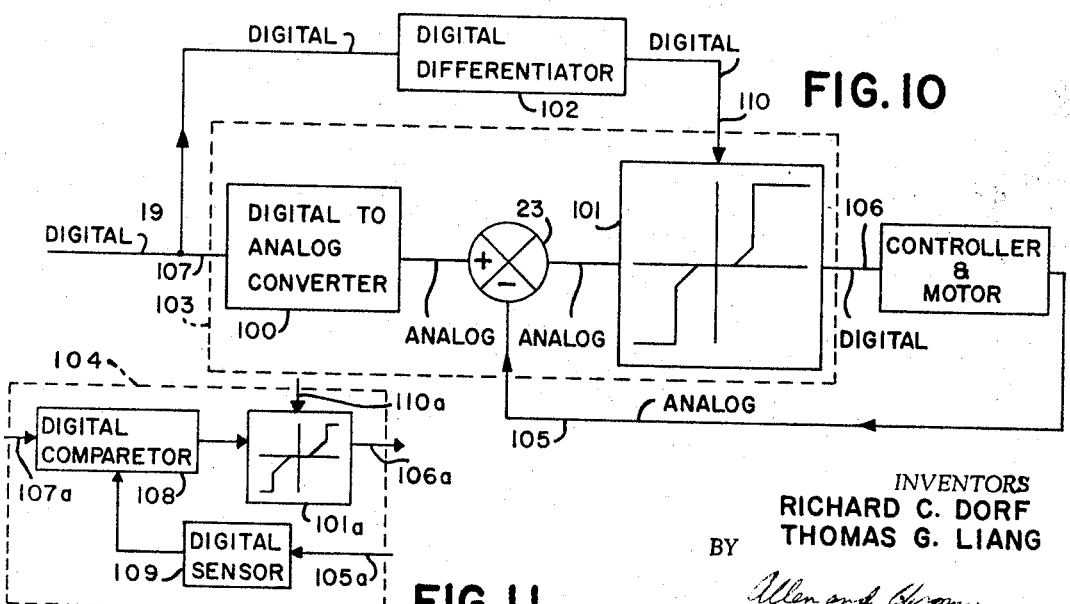
FIG. 10
FIG. 11
INVENTORS
RICHARD C. DORF
THOMAS G. LIANG
BY
ATTORNEYS

3,448,362
STEP MOTOR CONTROL SYSTEM
Richard C. Dorf, 16141 Azalea Way, Los Gatos, Calif.
95030, and Thomas G. Liang, 724 E. 9th St., Apt. A7,
Tucson, Ariz. 85719
Filed May 23, 1966, Ser. No. 552,299
Int. Cl. H02k 17/34; H02p 5/00
U.S. Cl. 318—138                                6 Claims

ABSTRACT OF THE DISCLOSURE

An automatic control system for any servo system where a step motor can be substituted for any other electromechanical energy conversion device. The step motor is controlled by the control elements so it attains a desired operating state, time-vary or otherwise, defined by an arbitrary deterministic control system input signal, which is allowed to vary arbitrarily even before the system attains the said desired operating state, in the minimum amount of time possible without any overshoot or undershoot. In contributing to this feature the step motor is run at substantially high speeds so that the cumulative movement of each small step of the step motor can be very closely approximated to that of a continuous motor. Consequently, the discrete integrating action of the step motor when operated at high speed converts the motor to a continuous servo integrator.

---

This invention relates to step motor controls generally. More specifically, this invention relates to time optimum step motor controls which are supplied with an arbitrary deterministic input.

An object of this invention is to provide an improved step motor control system which reaches an arbitrary deterministic input in an optimum time interval.

Still another object of this invention is to provide a step motor control system employing pulse frequency modulation for converting an analogue input to a pulse output.

A further object of this invention is to provide a dual mode derivative feed forward step motor system, the response of which is time optimum for an arbitrary input.

Another object of this invention is to provide a step motor control system which is constructed so that there is substantially no overshoot or undershoot in the step motor response after it reaches any desired arbitrary operating state.

Still another object of this invention is to provide a step motor control system constructed so that the system will reach the preferred operating state in the optimum time and will thereafter track this state with negligible error.

Another object of this invention is to provide a step motor control system constructed so that the response thereof will be in an optimum time interval, substantially independent of the load placed on the motor, which load may vary.

Still another object of this invention is to provide a step motor control system having time optimum response, said motor being adapted to operate missile jetavators, mechanical valves, rotary supports for guns, cannons and the like, rotary mounts for large tracking antennas and similar loads.

Other and further objects of this invention will be apparent to those skilled in the art to which it relates from the following specification, claims and drawing.

In accordance with this invention there is provided a control system for use in controlling a step motor whereby the advantages of such motors may be more fully utilized. Step motors have certain advantages over continuously energized motors and among these advantages may be noted fast signal response, accurate motion with magnetic detents, insensitivity to voltage and power amplitude variations, and in addition, the motor may be used as a variable frequency motor, brushless D.C. motor, open loop servo to eliminate feed back circuits, incremental output motor, digitally driven motor, synchronous motor, and a pulse counter or integrator. In the past the step motor has been used chiefly as an open loop device with inputs having fixed values of frequency. In the present system, the motor is used as a continuous integrator in a closed look employing an integral pulse frequency modulator.

A specific embodiment of this invention is described in the following specification and illustrated in the drawings in which, briefly:

FIG. 1 is a wiring diagram illustrating an embodiment of this invention;

FIG. 2 is a detail wiring diagram of one of the relay sensor units employed in the circuit diagram shown in FIG. 1;

FIG. 3 is a detail wiring diagram of another relay sensor unit employed in the wiring diagram shown in FIG. 1;

FIG. 4 is a wiring diagram of the integral pulse frequency modulator shown in one of the blocks illustrated in FIG. 1;

FIG. 8 illustrates curves showing the response characteristic of this apparatus with a step plus ramp voltage input;

FIG. 9 illustrates curves showing the response characteristic of this apparatus with a step plus parabolic voltage input; and FIG. 10 is a schematic diagram of a modification of this apparatus in which a digital control signal is employed.

FIG. 11 is a schematic diagram of a further modification of this apparatus employing a digital control signal.

Figure 5:
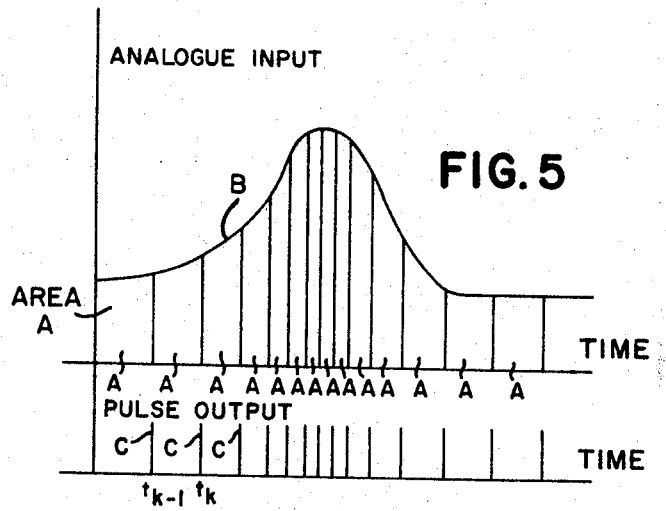
FIG. 5 shows graphs of the analog input and pulse output of the integral pulse frequency modulator employed in this invention.

Referring to the drawing in detail, there is shown in FIG. 1 a detailed circuit diagram of connections of an embodiment of this invention in which reference numeral 10 designates a high gain amplifier circuit which is employed as a differentiator with sign inversion. This amplifier circuit is provided with an input 11 which is supplied with the control signal. This amplifier circuit is also provided with an output 12 which is connected to the input 14 of the amplifier circuit 13. The output 15 of amplifier circuit 13 is connected to the input of the absolute value circuit 16 which provides an output that is a positive value of the input whether the input is positive or negative. The output of the absolute value circuit 16 is connected to the terminal 67 of the sensor unit 18. The wiring diagram of the sensor unit 18 is shown in FIG. 2 of the drawing and will be described in detail in connection with this figure.

The absolute value circuit 16 is provided with diodes 19 and 20 and amplifiers 21 and 22. The anode of diode 19 and the cathode of diode 20 are connected to the output 15 of amplifier 13. The cathode of diode 19 is connected to the input of amplifier 21 and the anode of diode 20 is connected to the input of amplifier 22. The output of amplifier 21 is connected to the input of amplifier 22. Each of the amplifiers 21 and 22 is provided with a gain of minus one.

Diode 19 accepts input signals which are positive and conducts these signals to the input of amplifier 21 which supplies a negative signal to the input of amplifier 22 and this amplifier supplies a positive output signal to terminal 67 of the sensor 18. On the other hand, if a negative signal is supplied to the input of the absolute circuit 16 the diode 20 accepts this signal and supplies this negative signal to the input of amplifier 22 which thus again, supplies a positive output signal to the terminal 67 of sensor 18. Thus, in both cases the amplifier 22 supplies a positive output signal.

A summing amplifier 23 is provided to this apparatus. This amplifier is supplied with two input signals. One of these signals is obtained from the input terminal 11 and the other signal is obtained from the output of amplifier 24 which has a gain of minus one whereby the voltage to its input from the variable contact 26 of the potentiometer 25 is transmitted to one of the inputs of amplifier 23 without gain but with reversed sign. The variable contact 26 of potentiometer 25 is connected by a mechanical connection 27 to the motor 30. This connection 27 includes a reduction gearing which is connected to the shaft of the motor so that the contact 26 is moved relatively slowly compared to the motion of the shaft of the motor. This potentiometer is of the multiple revolution type so that a multiplicity of revolutions is required to shift the variable contact 26 from one end of the resistance of the potentiometer to the other. The ends of the potentiometer resistance are connected to terminal 28 and 29 which are connected to a minus 40 volt and a plus 40 volt supply, respectively. A point at or near the mid point of the resistance is grounded. These voltage values are arbitrary and other values may be selected, depending upon the application of the invention.

The output of the summing amplifier circuit 23 provides the error signal. This signal is supplied to the input of the absolute value circuit 31 and to terminal 39 of sensor 40. Circuit 31 is similar to the absolute value circuit 16 in that it provides a positive signal at its output irrespective of whether the input signal is positive or negative. The error signal is fed to the anode of diode 35 and to the cathode of diode 34. Diode 35 transmits a positive signal to the input of amplifier 32 which supplies a negative signal corresponding to the input signal to the input of amplifier 33, and amplifier 33 supplies a positive output signal to terminals 37 and 38 of the sensor circuit 18. When the error signal is negative, diode 34 which has the cathode thereof connected to the input of the circuit 31, transmits the error signal to the input of the amplifier 33 which supplies a positive signal corresponding thereto to the terminals 37 and 38 of sensor 18.

Terminal 39 of sensor 40 is also supplied with the error signal from the output of amplifier circuit 23. The wiring diagram of sensor 40 and 41 is shown in detail in FIG. 3 and will be described in connection with this figure. Terminals 43 and 45 of sensor 40 are connected to terminals 47 and 48 of the motor controller 46, respectively. The controller 46 provides the input to the polyphase motor 30 which is of the step type. For this purpose, three phase lines 49, 50 and 51 are provided between the controller 46 and step motor 30, plus a neutral line 52. A power source is connected to the terminals 53 and 54 of the controller 46. The controller 46 and step motor 30 may be of the type manufactured by IMC Magnetics Corporation and sold by it under the trademark Tormax. Sensor 40 controls the energization of the clockwise or counterclockwise lines connected to the terminals 47 and 48, respectively, of the controller 46 in accordance with the polarity of the signal supplied to the terminal 39 of the sensor from the output of the error amplifier 23, as will be described more fully hereinafter.

Terminal 44 of the sensor 40 is connected to the terminal 55 of sensor 41, and terminal 56 of this latter sensor is connected to the output terminal 57 of the integral pulse frequency modulator 58. The wiring diagram of this pulse frequency modulator 58 is shown in FIG. 4 and will be described in connection with the description of this figure. Terminal 59 of the modulator 58 is connected to the negative terminal of the floating current supply 60 and the positive terminal of this current supply is connected to the upper terminal of resistor 62 and the emitter of transistor 61. Transistors 61 and 63 function as a unity voltage gain current amplifier. The base of this transistor is connected to the emitter of transistor 63 and the collectors of these two transistors are connected together to one side of the resistor 64. The other side of this resistor is connected to a source of current supply. The base of transistor 63 is connected to the terminal 65 of sensor 18.

Terminals 66 and 17 of sensor 18 are connected together and to the positive terminal of a 60 volt current supply source. Terminal 68 is connected to the variable contact of the potentiometer 69 which is connected across a 40 volt current supply source, the upper terminal of this potentiometer being connected to the positive terminal of the source. This source supplies the mode voltage for this apparatus and the source connected across the potentiometer 70 supplies the dead band voltage. The purposes of these voltages will be described in the operation of this apparatus. The variable contact of the potentiometer 70 supplying the dead band voltage is connected to the terminal 71 of sensor 41, and terminal 72 of this sensor is connected to the terminal 73 of sensor 18.

A standard test input circuit 74 may be provided to this apparatus for supplying various standard test signals such as ramp, parabolic and step voltages to the input terminal 11 of this apparatus. The test input circuit 74 is provided with amplifiers 75 and 76. Amplifier 75 functions as a ramp signal generator and amplifiers 75 and 76 together function as the parabolic signal generator. The input of amplifier 75 is connected to the switch 77 which is mechanically coupled to switch 80 so that these two switches are operated simultaneously. Contact 78 of switch 77 is connected to the variable contact of potentiometer 81 which is connected across a 40 volt current supply and is employed for providing the parabolic signal input which is supplied to contact 82 of switch 80 connected to the output of amplifier 76. Potentiometer 83 is connected across another 40 volt current supply to provide the ramp input and the variable contact of this potentiometer is connected to the contact 79 of switch 77. When switch 77 is positioned on contact 79, the amplifier 75 supplies the ramp voltage to contact 84 of switch 80. When a step input signal is to be applied to the input 11 of this apparatus, then switch 80 is positioned on contact 85 which is connected to a plus or minus terminal of a 40 volt current supply, depending upon the polarity of the step desired. On the other hand, when an external input is to be applied to the apparatus, then switch 80 is positioned on contact 86 which is connected to the external supply signal.

Referring to FIG. 2 of the drawing, there is illustrated a two-relay sensor unit such as is employed in the block 18 shown in FIG. 1. This sensor unit is provided with input terminals 37 and 68 which are connected to the bases of transistors 18c and 18e, respectively. This unit functions to compare the magnitudes of the signals connected to these inputs so that relays 18a or 18b may be energized, depending on which input signal is greater. The windings of relays 18a and 18b are connected between the positive 60 volt current supply and the collectors of transistors 18c–18d and transistors 18e–18f. The emitters of transistors 18c and 18e are connected to the bases of transistors 18d and 18f, respectively, and the emitters of the latter transistors are connected to the anodes of diodes 18g and 18h, respectively. The cathodes of diodes 18g and 18h are connected together and to the collector of transistor 18i. The emitter of transistor 18i is connected to the minus terminal of a 20 volt current supply which, together with the transistor 18i and resistance network illustrated, forms a constant current source.

Relay 18a is provided with a movable arm 73a which is connected to the terminal 73 shown in the block diagram. Likewise, the fixed contacts 38a and 66a of relay 18a which are adapted to be engaged by the movable arm 73a, are connected to the terminals 38 and 66, respectively, as shown in the block diagram, and the movable arm 65a of relay 18b and its associated fixed contacts 17a and 67a are connected to terminals 17 and 67, respectively, shown in the block 18 diagram.

The sensor 18 functions to compare the magnitudes of the absolute value of the error signal voltage and the mode voltage supplied to the terminals 37 and 68, respectively. When the error signal voltage applied to terminal 37 is larger in magnitude than the mode voltage applied to terminal 68, relay 18a of sensor 18 is energised and relay arm 73a of relay 18a is moved away from the normally closed contact 38 to engage the normally open contact 66 and the 60 volt signal supplied to input terminal 72 of sensor 41 is compared with the magnitude of the dead band voltage supplied to terminal 71 by the voltage source connected to potentiometer 70. At the same time, relay 18b of sensor 18 is not energized so that the movable arm 65a thereof remains in engagement with the normally closed contact 17a and the 60 volt signal is supplied to the integral pulse frequency modulator 58 therethrough. On the other hand, when the absolute value of the error signal voltage supplied to input terminal 37 is in magnitude less than the mode voltage, then the winding of relay 18b is energized and the movable arm 65a of this relay is moved away from the normally closed contact 17a to the normally open contact 67a to close circuit therewith and supply the output of the differentiator through the absolute value amplifier 16 to the input of the modulator 58. When relay 18b is energized relay 18a is not energized and the movable contact arm 72a thereof remains in engagement with the normally closed contact 38a so that the error signal voltage is supplied to input terminal 72 of sensor 41.

Thus, the sensor 18 functions to compare the mode voltage obtained from potentiometer 69, the movable contact of which is connected to the input terminal 68 of the sensor, with the error voltage which is supplied from the output of amplifier 33 of the absolute value circuit 31 which is supplied to terminal 37 of the sensor.

Sensors 40 and 41 are connected as shown in FIG. 3. The sensor shown in FIG. 3 is the same as that shown in FIG. 2 except that it employs a resistor 40a in place of the relay 18a shown in the sensor illustrated in FIG. 2. Thus, the input terminals 39 and 42 of sensor 40 are connected to the bases of transistors 40c and 40e, respectively. The collectors of transistors 40c and 40d are connected together to the lower terminal of the resistor 40a, and the upper terminal of this resistor is connected to the plus 60 volt supply together with the upper terminal of winding of relay 40b. The lower terminal of this relay winding is connected to the collectors of transistors 40e and 40f. The emitters of transistors 40c and 40e are connected to the bases of transistors 40d and 40f, respectively, and the emitters of transistors 40d and 40f are connected to the anodes of diodes 40g and 40h, respectively. The cathodes of these diodes are connected together and to the collector of transistor 40i. Transistor 40i and the associated resistor network, together with the minus 20 volt current supply, provide a constant current source to the cathodes of diodes 40g and 40h.

The input terminal 42 of sensor 40 is grounded and the input terminal 39 is connected to the error signal line ahead of the absolute value device 31. Thus, the sensor 40 is responsive to the polarity of the error signal and it operates to control the energization of the clockwise and counterclockwise signal lines connected between terminals 43 and 45 of sensor 40 and terminals 47 and 48 of the motor controller 46. If the error signal supplied to input terminal 39 is positive, then transistors 40c and 40d saturate and the winding of relay 40b remains de-energized. The movable arm 44a of relay 40b remains in contact with the normally closed contact 43a, and the clockwise line connected to terminal 47 of controller 46 is energized so that the motor 40 is stepped in the clockwise direction. On the other hand, if the error signal is negative, then transistors 40e and 40f saturate and the winding of relay 40b is energized. The arm 44a of relay 40b is moved from the normally closed contact 43a to the normally open contact 45a which is connected to the line leading to the counterclockwise terminal 48 of the controller. Thus, the controller is caused to energize the step motor 30 in the counterclockwise direction.

The diagram of connections shown in FIG. 3 also applies to sensor 41. Thus, relay terminals 55, 120 and 56 of the sensor 41 correspond to the normally closed contact 43a, normally open contact 45a and movable arm 44a, respectively, shown in the detailed diagram, FIG. 3, and the input terminals 71 and 72 of the sensor 41 correspond to the input terminals 42 and 39, respectively, shown in FIG. 3. Sensor 41 has the input terminal 71 thereof connected to the adjustable contact of potentiometer 70 which provides the dead band voltage, and input terminal 72 is connected to terminal 73 of sensor 18 which is connected to the movable arm 73a of relay 18a. Thus, when the magnitude of the error signal supplied to the input terminal 37 of sensor 18 is greater than the mode voltage supplied to input terminal 68, relay 18a is energized and movable contact 73a thereof is moved off of contact 38a to contact 66a so that the D.C. voltage of +60 volts connected to terminal 67 is supplied to the input terminal 72 of sensor 41. The deadband voltage, being in the order of 1 to 2 volts, is always less than the applied 60 volts. (Other D.C. voltages greater than 2 volts can also be used. For this apparatus, 60 volts is a convenient source.) So the relay in sensor 41 is then de-energized and arm 56a remains at the normally closed contact 55a; so that the signal at the output 57 of modulator 58 is able to reach the controller. When the magnitude of the error signal supplied to the input terminal 37 of sensor 18 is decreased to a magnitude below the mode voltage, sensor 18 causes relay 18a to move B-arm from contact 66a to contact 38a. The magnitude of the error signal at terminal 38 of sensor 18 is then fed to input terminal 72 of sensor 41. If the magnitude of the error signal is still greater than the dead band voltage, movable contact 56a remains at the normally closed position 55a, thus remaining in the previously discussed state when the magnitude of the error signal at 37 is greater than the mode voltage at 68. However, when the magnitude of the error signal at terminal 72 of sensor 41 is less than the deadband voltage at terminal 71 of sensor 41, movable contact 56a is moved off normally closed contact 55a to normally open contact 120; so that the pulse output at 57 of modulator 58 is prevented from reaching the controller 46. When this happens, the motor ceases to operate.

In recapitulation, the function of sensor 41 is to permit the motor to run when the magnitude of the error voltage is greater than the deadband voltage, and to turn the motor off when the magnitude of the error voltage is less than the deadband voltage.

Referring to FIG. 4 there is shown the wiring diagram of the integral pulse frequency modulator 58 which is provided with output terminal 57, input terminal 59 and ground 87, as shown in FIG. 1. This modulator is provided with a continuously varying analogue input which is supplied by the output of transistor amplifier 61–63 and is connected to the input terminal 59. Thus, this signal is supplied through resistors 96 and 97 to the emitters of transistors 92 and 93, respectively. Transistors 92 and 93 function as variable current charging transistors for charging the cross coupling capacitors 90 and 91, respectively. The bases of transistors 92 and 93 are connected together and to a terminal of the low impedance bias network 94 which includes resistors 94a and 94b, a capacitor 94c and a source of voltage supply 94d connected as shown in the drawing. The collectors of transistors 92 and 93 are connected to the bases of transistors 88 and 89, respectively, and also to one side of each of the coupling capacitors 90 and 91, respectively. Capacitor 90 is connected between the collector of transistor 89 and the base of transistor 88, and capacitor 91 is connected between the collector of transistor 88 and base of transistor 89. The emitters of transistors 88 and 89 are connected together and to the bias network 94.

The integral pulse frequency modulator 58 comprises a variable current astable multivibrator. The analogue input to the input terminal 59 of this modulator may be supplied either by the absolute amplifier 16, which is connected to the differentiating circuit 10 through the amplifier circuit 13, or by the 60 volt D.C. source depending on whether the movable arm of relay 18b is connected to contact 17a or 67a, as previously described. This input signal may have the varying characteristics such as illustrated by curve B in FIG. 5, for example, and it is supplied to the emitters of transistors 92 and 93. If, for example, transistor 89 of the astable multivibrator is saturated, then the input signal charges capacitor 90 through the variable current transistor 92 until the base of transistor 88 is at a voltage slightly greater than zero, at which time transistor 88 is switched on. A pulse corresponding to one of the pulses C shown in FIG. 5 is then supplied to the output terminal 57 of the modulator. Input signal is then supplied through the variable current transistor 93 to charge capacitor 91 until the base of transistor 89 is at a voltage slightly greater than zero, at which time this transistor will be switched on. Another C pulse is then supplied to the output terminal 57. It will be noted that the timing or spacing of the pulses C, shown in FIG. 5, vary in accordance with the amplitude of curve B. Thus, a pulse C is produced corresponding to each area A under the curve B and these pulses therefore are supplied to the output terminal 57 of the modulator at a determinable variable rate corresponding to the integral of the curve B. Thus, a signal varying in amplitude is supplied to the input of the modulator and the modulator generates an output made up of pulses, the frequency of which is determined by the voltage of the input. For example, if the input is a 20 volt D.S. signal, the frequency of the output pulses may be 200 Hertz, and for 10 volt DC input the output pulse frequency may be 100 Hertz.

Figure 6:
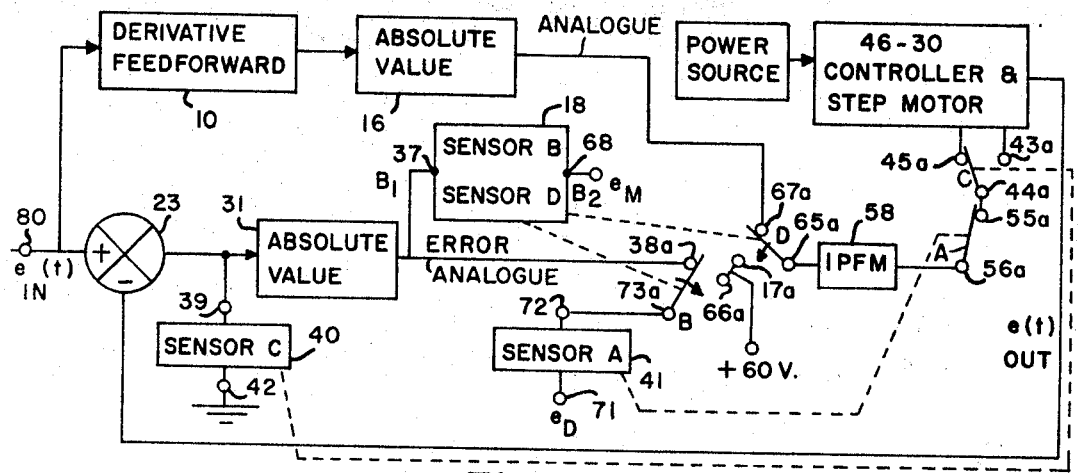
FIG. 6 is a simplified schematic wiring diagram employed for the purpose of facilitating explanation of the operation of this invention.
Figure 7:
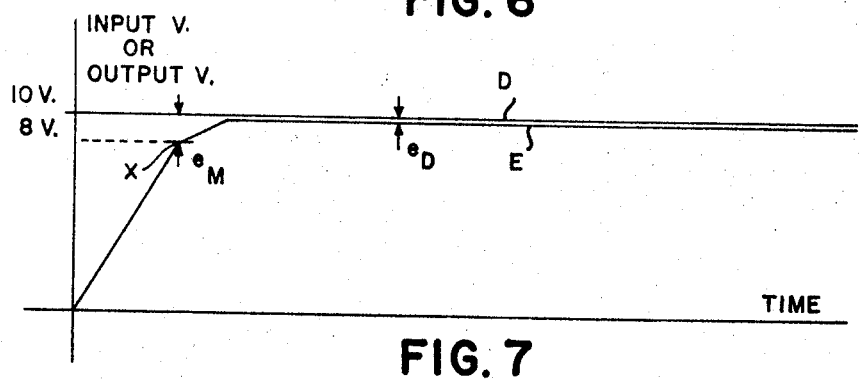
FIG. 7 illustrates curves showing the response characteristic of this apparatus with a step voltage input.

Reference is now made to the simplified wiring diagram shown in FIG. 6 which will be used in connection with the discussion of the operation of this apparatus. The same reference numerals are employed in this figure as are employed in FIG. 1 for corresponding parts. The graphs shown in FIGS. 7, 8 and 9 are also used to illustrate the operation of this apparatus for different types of inputs. The upper curve D, shown in FIG. 7, designates the input voltage supplied to the terminal 80 which is connected by switch 80a to the input terminal 11 of the apparatus. This curve is designated as the step input and consists of a constant voltage applied to the input terminal of the apparatus. Curve E corresponds to the shaft position of the motor 30 converted to output volts obtained from variable contact 26 of potentiometer 25. Thus, this curve corresponds to the output voltage supplied to the amplifier 24 and through this amplifier to the summation amplifier 23. The difference between curves D and E, designated in FIG. 7 as $e_M$, corresponds to the mode voltage obtained by the variable contact of potentiometer 69 from the source of supply connected to this potentiometer. The voltage $e_D$ shown in the curve FIG. 7 as the difference between the horizontal parts of curves D and E is of substantially the same magnitude as the dead band voltage obtained by the variable contact of potentiometer 70 from the source connected to this potentiometer.

Curve F of FIG. 8 represents the input voltage supplied to the input terminal of FIG. 1 when this input consists of a step voltage plus ramp voltage. Curve G corresponds to the output voltage obtained from feedback potentiometer 25 by the variable contact 26 as in connection with curve E shown in FIG. 7. The difference between the parallel parts of curves F and G is designated as the error voltage between the mode voltage $e_M$ and the dead band $e_D$ voltage. The mode voltage also is illustrated by the difference designated as $e_M$ in this curve.

The graph shown in FIG. 9 illustrates the input obtained with a step voltage plus a parabolic voltage as represented by the curve H. The output curve I is shown slightly displaced below the curve H and the difference between these two curves designated as the error voltage is some value between the mode voltage $e_M$ and the dead band voltage $e_D$. The mode voltage $e_M$ is indicated where the steep part of the output curve approaches the input curve.

The curves shown in FIGS. 7, 8 and 9 illustrate the operating characteristics of this apparatus required for the step motor to reach the desired constant or time varying operating state in substantially the least amount of time necessary for the motor to reach its maximum rated speed without overshoot or undershoot.

At the start of the operation of the motor, when a step voltage of for example 10 volts, as shown in FIG. 7, is applied to the input terminal 11, the motor output as shown by the curve E starts at zero and climbs rapidly until it reaches the point X. During this time interval, the error voltage is large so that the error signal applied to terminal 37 of sensor 18 will be substantially larger than the mode voltage applied to terminal 68. Consequently, relay 18a of this sensor will be energized and will move the arm 73a from the normally closed contact 38a to the normally open contact 66a which is connected to the 60 volt supply. Consequently, 60 volts is supplied to the transistor amplifier 61–63 to supplement the voltage of supply 60 and to energize the input of the integral pulse frequency modulator 58. Relay contact 55 and arm 56 of sensor 41 are closed as shown in FIG. 6, since the error voltage supplied to terminal 72 is greater than the dead band voltage supplied to terminal 71. When the error voltage is reduced to below the point $e_M$ shown in FIG. 7, the error voltage is less than the mode voltage supplied to terminal 68 of sensor 18, and relay 18b of this sensor at terminal 37 is energized. When the mode voltage is approached relay 18b moves the arm 65a thereof off of contact 17a to contact 67a so that the integral pulse frequency modulator 58 now receives the motor speed control signal corresponding to small errors on its input which corresponds to the differentiated signal from the absolute value amplifier 16. As the error voltage is reduced, the curve E shown in FIG. 7 approaches the curve D and the error voltage approaches the dead band voltage $e_D$.

It is thus seen that, if the error voltage is greater than the mode voltage, the input to the integral pulse frequency modulator 58 is approximately 60 volts, plus the voltage of the floating supply 60. On the other hand, if the error voltage is greater than the dead band voltage $e_D$ and less than the mode voltage $e_M$, the input to the integral pulse frequency modulator 58 is from the output of amplifier 16 which is connected to the derivative amplifier 10 through amplifier 13.

Sensor 41 compares the dead band voltage to the output of absolute amplifier 31 which is the error voltage. Thus, sensor 41 turns the system on and off and the system is in operative condition when the error voltage is between its maximum value down to the dead band voltage, and when the error voltage is reduced to the dead band voltage range, sensor 41 functions to open the circuit between its relay arm 56a and contact 55a. When a step voltage plus a ramp voltage, as shown in FIG. 8 curve F, is supplied as the input the magnitude of the input voltage increases linearly with time. The motor output as shown by curve G increases rapidly until it reaches the point Y. During this time the input to the modulator 58 is obtained from the 60 volt supply connected to terminal 67 and from the 17 volt source 60. The modulator 58 supplies pulses as shown by graph FIG. 5 to the motor controller 46. After the motor output reaches point Y the motor slows down until the error or difference between the input as represented by curve F and output as represented by curve G is some small constant difference. For the time varying input represented in FIG. 8 the error never reaches the deadband voltage and the motor runs at constant speed in an effort to follow the input voltage. When a step voltage plus a parabolic voltage increasing with time squared as shown by curve H in FIG. 9 is supplied as the input the motor output increases rapidly until it reaches the point Z curve I. In this case error also never reaches the deadband voltage and the motor runs at increasing speed in an effort to follow the input voltage.

Both deadband and mode voltages are manually adjustable by varying the potentiometers 70 and 69. However, if the deadband voltage is set higher than the mode voltage the system is turned off.

In FIGS. 10 and 11 there are shown schematic diagrams illustrating the application of this control system to a digital input supplied to terminal 19 instead of the analogue input supplied to this terminal in accordance with the previously described system. The operation of these modified systems is the same as that of the system shown in FIG. 1 with the exception of the parts described hereinafter. The apparatus shown in FIG. 10 employs a digital to analogue converter 100 having its input connected to the terminal 19 and its output connected to the summation amplifier 23. This converter may be of the type illustrated and described on pages 744 to 747, inclusive, of the book, "Digital Computer and Control Engineering," by Robert Stephen Ledley, published by McGraw-Hill Book Co., Inc., in 1960. In the arrangement shown in FIG. 10 the block 101 includes the sensors 18, 40 and 41, absolute value amplifier 31, and modulator 58, shown in FIGS. 1 and 6. Block 102 includes the differentiator 10 and absolute value amplifier 16, shown in FIGS. 1 and 6. The apparatus shown in FIG. 11 designated by the reference numeral 104 may be substituted for the apparatus enclosed in the broken line 103 shown in FIG. 10. In the embodiment shown in FIG. 11, the voltage supplied on line 105 corresponds to the voltage from potentiometer 25 shown in FIG. 1 and is fed to the digital sensor 109. The output of this sensor is fed to the digital comparator 108. The comparator 108 is also supplied with a digital input on line 107. The output from the comparator 108 is supplied to the sensor and modulator apparatus 101 which includes the sensors 18, 40 and 41, modulator 58 and absolute value amplified 31, shown in FIG. 1. The digital comparator 108 and digital sensor 109 may be constructed as described on pages 739 to 747, inclusive, of the above mentioned book.

While we have described embodiments of our apparatus in detail with respect to certain embodiments thereof, we do not desire to limit the scope of this invention to the details, voltages, etc. set forth since various modifications may be made therein within the spirit and scope of the appended claims.

What we claim is:

1. In a nonlinear time optimal motor control system, the combination of a step motor and associated controller, means supplying an initial input signal to said motor having a magnitude such that after said initial input signal is supplied to said step motor said motor is adapted to gain substantially maximum speed in a minimum time, means supplying a control system input signal, means producing a signal characterized by the rate of change of a characteristic of said control system input signal, means associated with said motor producing a voltage depending on the operation of said motor, means producing an error signal from said voltage and from said control system input signal, means comparing the magnitude of said error signal with predetermined voltages, means producing pulses, means responsive to said comparing means after the magnitude of said error signal has decreased to a predetermined value disconnecting said initial input signal from said pulse producing means input and connecting said control system input signal to the input of said pulse producing means, said last mentioned means supplying pulses from said pulse producing means to said controller whereby said step motor will reach the desired constant or time varying operating state in substantially the least amount of time required for the motor to reach its maximum rated speed without overshoot or undershoot.

2. In a nonlinear time optimal motor control system as set forth in claim 1, further characterized in that the means associated with said motor produces a voltage directly proportional to the angular position of the shaft of said motor.

3. In a nonlinear time optimal motor control system as set forth in claim 1, further characterized in that the predetermined voltages with which the magnitude of said error signal is compared are derived from manually adjustable means and one of these voltages is adjusted to be greater than the other.

4. In a nonlinear time optimal motor control system the combination as set forth in claim 1, further characterized in that said pulse producing means comprises an integrating pulse frequency modulator which produces said pulses at a rate determined by the amplitude of the control signal.

5. In a nonlinear time optimal motor control system the combination as set forth in claim 4, further characterized in that said producing means comprises a differentiating device and an absolute value device supplying a signal or predetermined polarity to said modulator.

6. In a nonlinear time optimal motor control system the combination as set forth in claim 1, further characterized in that said error signal producing means provides an input to a signal polarity sensor which is connected to control the direction of rotation of said motor.

References Cited

UNITED STATES PATENTS

| | | |
|---|---|---|
| 2,701,328 | 2/1955 | Woodruff. |
| 2,766,412 | 10/1956 | Stephenson. |
| 3,109,974 | 11/1963 | Hallmark. |
| 3,110,865 | 11/1963 | Scuitto. |
| 3,204,132 | 8/1965 | Benaglio. |
| 3,344,260 | 9/1967 | Lukens. |
| 3,349,229 | 10/1967 | Evans. |
| 3,374,410 | 3/1968 | Cronquist. |

ORIS L. RADER, *Primary Examiner.*

G. R. SIMMONS, *Assistant Examiner.*

U.S. Cl. X.R.

318—18, 254